United States Patent [19]
Ralston et al.

[11] Patent Number: 6,026,611
[45] Date of Patent: Feb. 22, 2000

[54] POWER SLIDING WINDOW ASSEMBLY

[75] Inventors: Daniel D. Ralston, Royal Oak; Jeffrey S. Wilkinson, Southfield; Gary L. Ray, Cassopolis, all of Mich.; Kelly J. Harris, Lawrenceburg, Tenn.

[73] Assignee: Dura Automotive Systems, Inc., Rochester Hills, Mich.

[21] Appl. No.: 09/318,300

[22] Filed: May 25, 1999

[51] Int. Cl.[7] ................................................ E05C 7/06
[52] U.S. Cl. ............................................... 49/123; 49/360
[58] Field of Search ............................. 49/380, 352, 125, 49/116, 118, 123, 360

[56] References Cited

U.S. PATENT DOCUMENTS

| | | |
|---|---|---|
| 4,171,594 | 10/1979 | Cocanzi ..................................... 49/352 |
| 5,511,443 | 4/1996 | Munekhoff ............................ 49/352 X |
| 5,542,214 | 8/1996 | Buening . |
| 5,613,323 | 3/1997 | Buening . |
| 5,724,769 | 3/1998 | Cripe et al. . |
| 5,749,174 | 5/1998 | Mariel . |
| 5,784,832 | 7/1998 | Leevan . |
| 5,799,449 | 9/1998 | Lyons et al. . |
| 5,832,667 | 11/1998 | Buening et al. . |
| 5,836,110 | 11/1998 | Buening et al. . |
| 5,864,987 | 2/1999 | Mariel et al. . |

FOREIGN PATENT DOCUMENTS

| | | | |
|---|---|---|---|
| 2738672 | 3/1979 | Germany | ................................. 49/352 |
| 2836398 | 2/1980 | Germany | ................................. 49/352 |

*Primary Examiner*—Jerry Redman
*Attorney, Agent, or Firm*—Banner & Witcoff, Ltd

[57] ABSTRACT

A pull-pull power sliding window assembly is disclosed, comprising a frame, a sliding pane slidable within the frame, and a pull-pull cable assembly for moving the sliding pane between a open and a closed position. The pull-pull cable assembly comprises a drive motor, a drive drum, and drive cable comprising a cable and a semi-rigid conduit wrapped around the cable, connecting the drive drum to the sliding pane for pulling the sliding pane back and forth. A retainer is mounted on the drive motor, a plunger is slidably received into an opening of the retainer, and the drive cable is routed through the plunger and into the retainer opening. A spring is positioned between the retainer and the plunger and is movable from an expanded condition where the plunger is biased away from the retainer and the drive cable is biased away from the sliding pane, and a compressed condition where the plunger is closer to the retainer and the drive cable extends further out of the conduit. A removable spring compressor compresses the spring, thereby preventing the spring from moving to the expanded condition. Thus, slack is maintained in the drive cable until the spring compressor is removed. A retrofitting kit for retrofitting a manual sliding window assembly to a power sliding window assembly is also disclosed.

15 Claims, 9 Drawing Sheets

POWER SLIDING WINDOW ASSEMBLY

FIELD OF THE INVENTION

The present invention is directed to a motor operated vehicle window construction and, more particularly, to a pull-pull power sliding window suitable for use in a motor vehicle.

BACKGROUND OF THE INVENTION

Motor vehicle window assemblies having one or more sliding panes, that is, panes which slide either substantially horizontally or vertically with respect to the window assembly, may be either manually operated or operated by an electric motor. Such window assemblies are used, for example, as rear slider windows for pickup truck cabs, typically having a circumferential (that is, outer peripheral) frame in which are mounted a sliding pane along with one or more fixed panes. The frame may be structural or semi-structural in that it integrates the sliding pane and one or more fixed panes as a self-contained preassembled module suitable for shipping and handling during installation into a motor vehicle.

Power sliding window assemblies are increasingly popular, particularly when used for backlights in pickup trucks, as it is awkward for the driver of a pickup truck to reach behind his seat and open a manually operated sliding window assembly. A power window assembly for a vehicle having a sliding pane is shown in U.S. Pat. No. 5,724,769 to Cripe et al. Cripe et al is a robust design for a pull-pull power sliding window assembly having left and right fixed panes and a horizontally sliding center pane sliding between upper and lower run channels. A drive motor, drive drum and drive cable pull the sliding pane back and forth in a manner similar to conventional cable drum window regulators. Cable directional blocks route drive cable from below the frame to a lower horizontal peripheral edge of the sliding pane. The drive cable is routed through a serpentine passageway in the cable directional blocks so as to extend generally parallel with the direction of travel of the sliding pane. Such a design advantageously routes the cables so as to avoid excessive drag associated with pulling the sliding pane up against the upper run channel or down against the lower run channel.

While such a design is excellent for reducing friction and thereby minimizing wear and tear, such designs can be difficult to assemble. This is particularly the case where retrofitting kits are used. Such kits are used to retrofit a sliding window assembly from manual to power. The difficulty in assembly using a retrofit kit occurs because there is insufficient "slack" in the cable to easily attach the cables to the sliding pane (or bracketry which is in turn connected to the sliding pane). The term slack is used here and by others skilled in the art to refer to the length of cable that extends beyond a semi-rigid conduit that the cable travels in for guidance. Such slackness is highly advantageous for ease of assembly, particularly connecting the cable to the sliding pane. Of course, the cables used in such applications stretch insignificantly. Instead, the springs urge the conduit to move with respect to the cable, and the more cable that extends from the conduit, the more "slack" the cable is. In a retrofit kit, the cables will have been previously wrapped around the drive drum and the springs have expanded move to the position where the cables extend little beyond the conduit. In this condition, the cables are not slack. In comparison, conventional cable drum mechanisms are connected to the sliding pane (or bracketry to be connected to the sliding pane) before the cable is wrapped around the drive drum. Thus, other means must be provided to allow for slack in the cable of retrofit kits for sliding window assemblies.

It would be desirable to provide a power sliding window assembly that is easy to assemble, particularly when used as a retrofitting kit.

In view of the foregoing, it is an object of the present invention to provide an easy to assemble pull-pull power sliding window assembly. It is an additional object of certain embodiments of the present invention to provide a retrofitting kit for retrofitting a manual sliding window assembly installed in a motor vehicle. It is another related object of the present invention to provide a pull-pull power sliding window assembly that is highly reliable in operation. Additional objects and optional features of the invention will be apparent form the following disclosure and detailed discussion of preferred embodiments.

SUMMARY OF THE INVENTION

In accordance with these and other objects, there is provided a power sliding window assembly having a circumferential frame, a sliding pane slidable between a open position and a closed position, and a pull-pull cable assembly. The pull-pull cable assembly comprises a drive motor and a drive drum rotatable by operation of the drive motor or hand crank. Drive cable connects the drive drum and the sliding pane so that the drive cable pulls the sliding pane toward the open position upon rotation of the drive drum in a first direction, and the drive cable pulls the sliding pane toward the closed position upon rotation of the drive drum in a second direction opposite the first direction. The cable is sheathed in a semi-rigid conduit. A retainer is mounted to the drive motor and a plunger is slidably received into an opening of the retainer. The plunger has a collar at one end. The drive cable is routed through the plunger and into the retainer opening. A spring is positioned between the plunger and the retainer and moves between an expanded condition where the plunger is biased away from the retainer and the drive cable extends beyond the conduit by a length, and a compressed condition where the plunger collar moves closer to the retainer and the drive cable extends beyond the conduit by an increased length. A removable spring compressor compresses the spring, restricting the spring from moving to the expanded condition. The removable spring compressor holds the spring and thereby increases slack in the drive cable. As noted above, the concept of slackness, as used herein, refers to the length of cable which extends beyond the conduit. A slack cable during assembly is a highly advantageous feature that makes it easier to attach the drive cable to the sliding pane.

In accordance with another aspect, a retrofitting kit is provided for retrofitting a manual sliding window assembly installed in a motor vehicle. The retrofitting kit includes a cable assembly having left and right cables, the aforementioned drive motor and drive drum, and a spring retainer assembly. The spring retainer assembly comprises left and right plungers and a retainer having left and right openings. Each plunger fits into a corresponding opening, and each cable is routed through the corresponding plunger and the corresponding opening where they are attached to the drive drum. Left and right cable slack take-up springs correspond to each cable, each spring positioned between corresponding plunger and retainer opening, each spring movable between an expanded condition where the corresponding plunger is biased away from the retainer to a compressed condition where the corresponding plunger is movable towards the retainer. Left and right removable spring compressors corresponding to the left and right springs restrict motion of each corresponding plunger away from the corresponding retainer opening and thereby restrict the springs from moving to the expanded condition. This keeps the cables slack until the spring compressors are removed. Such a retrofitting kit would typically also comprise an actuation switch for the motor and instructions for retrofitting the window assembly installed originally as a manual sliding type window assembly.

From the foregoing disclosure and the following more detailed description of various preferred embodiments it will be apparent to those skilled in the art that the present invention provides a significant advance in the technology and art of sliding window assemblies. Particularly significant in this regard is the potential the invention affords for reducing efforts associated with assembling such power sliding window assemblies. Additional features and advantages of various preferred embodiments will be better understood in view of the detailed description provided below.

Figure 1:
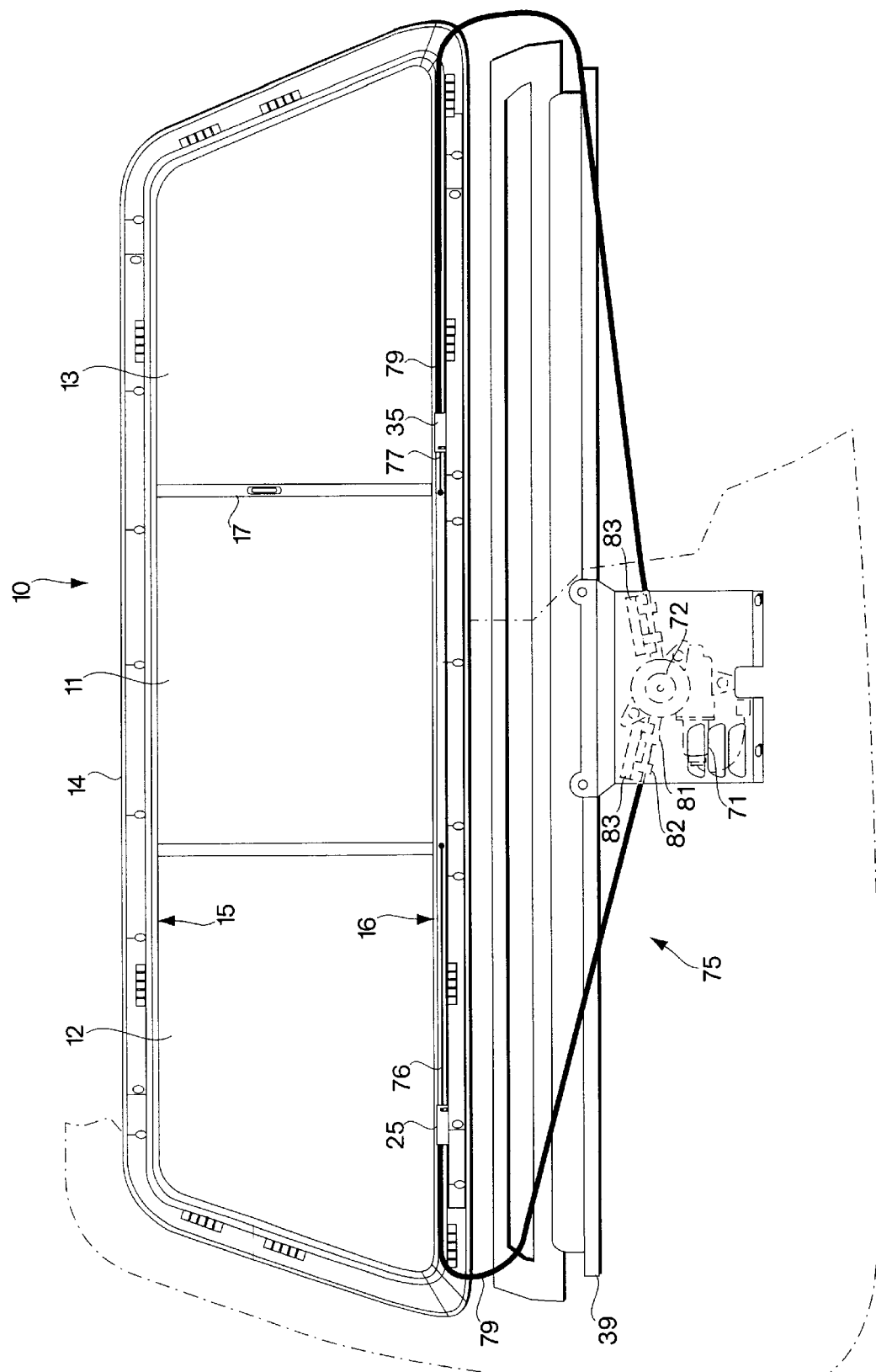
FIG. 1 is an inboard planar schematic view of a pull-pull power sliding window assembly in accordance with a preferred embodiment.

It should be understood that the appended drawings are not necessarily to scale, presenting a somewhat simplified representation of various preferred features illustrative of the basic principles of the invention. The specific design features of the pull-pull power sliding window assembly as disclosed here, including, for example, specific dimensions of the spring compressor, plunger and retainer will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the power sliding window assembly illustrated in the drawings. In general, front or frontward refers to a direction extending out of the plane of the paper in FIG. 1, and rear, rearward or backwards refers to a direction extending into the plane of the paper in FIG. 1.

DETAILED DESCRIPTION OF CERTAIN PREFERRED EMBODIMENTS

It will be apparent to those skilled in the art, that is, to those who have knowledge or experience in this area of technology that many uses and design variations are possible for the power sliding window assembly disclosed here. The following detailed discussion of various alternative and preferred features and embodiments will illustrate the general principles of the invention with reference to a power sliding window assembly for use closing an opening in the back of in a motor vehicle, the window assembly having a sliding pane which slides horizontally within the frame. Other embodiments suitable for other applications, as such as power sliding windows for side vent windows, and vertically sliding panes, will be apparent to those skilled in the art given the benefit of this disclosure.

Referring now to the drawings, FIG. 1 shows a preferred embodiment of a sliding window assembly 10 viewed from an inboard side, having a circumferential frame 14, a pair of fixed panes, 12, 13, and a sliding pane 11. The fixed panes can be adhesively bonded or otherwise attached to the frame 14. The sliding pane 11 is shown in this embodiment to be slidable in a horizontal motion between a closed position (as shown in FIG. 1) to a open position. An upper portion of a peripheral edge 17 of the sliding pane 11 is received in an upper run channel 15, and a lower portion of the peripheral edge of the sliding pane is received in a lower run channel 16. Vehicle trim may at least partially cover a lower portion of the frame 14 and a lower horizontal edge 18 of the sliding pane. A drive assembly 70 comprising an electric drive motor 71 and drive drum 72 is mounted on sheet metal of the cab 39 in a convenient location which need not necessarily be immediately adjacent the sliding window assembly. The drive drum rotates 72 by operation of the drive motor. A cable assembly 75 comprises left and right cables 76, 77 each largely sheathed by a conduit 79. The cables 76, 77 have cable endballs 78 positioned at the ends of each cable. One of the endballs 78 of each cable connects to the drive drum, and the other endball of each cable is attachable to the sliding pane via cradle 19. In this manner rotation of the drive drum in a first direction urges the cable to pull the sliding pane 11 toward the open position, and rotation of the drive drum in a second direction opposite the first direction urges the cable to pull the sliding pane toward the closed position. The connection to the sliding pane 11 is discussed in greater detail below.

Figure 2:
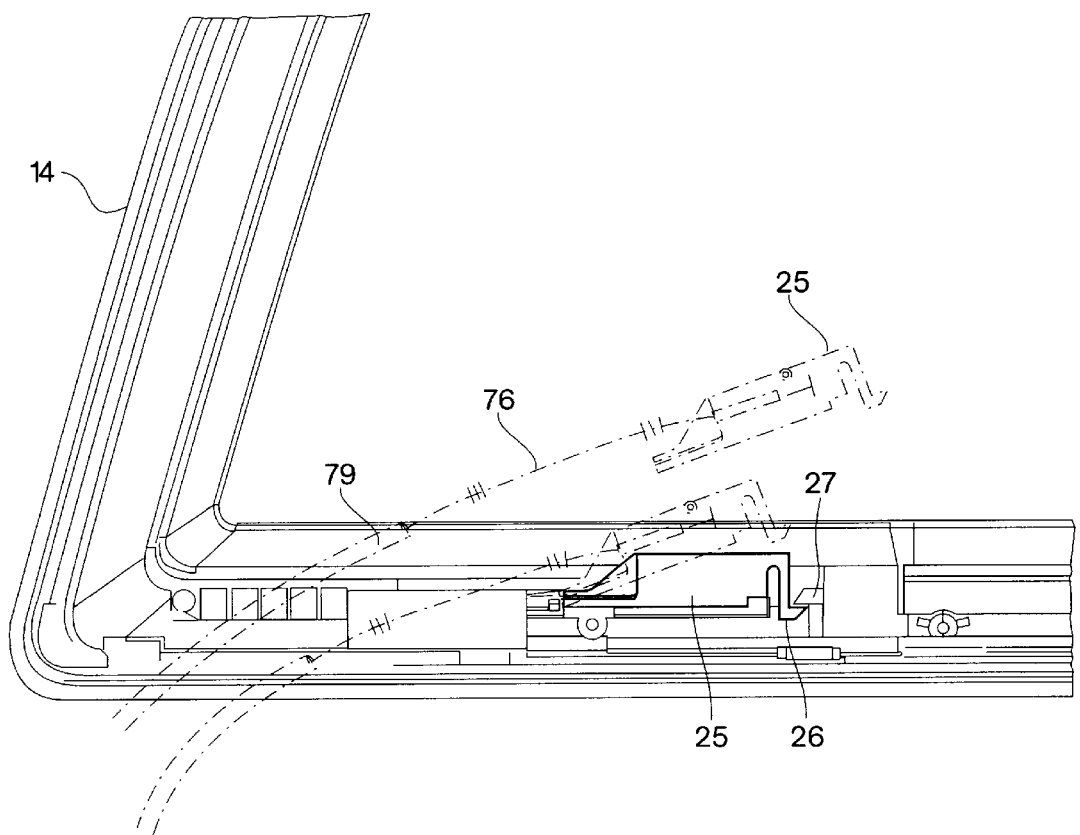
FIG. 2 is a partial side view with the backplate removed showing how the cable direction block is installed.
Figure 3:
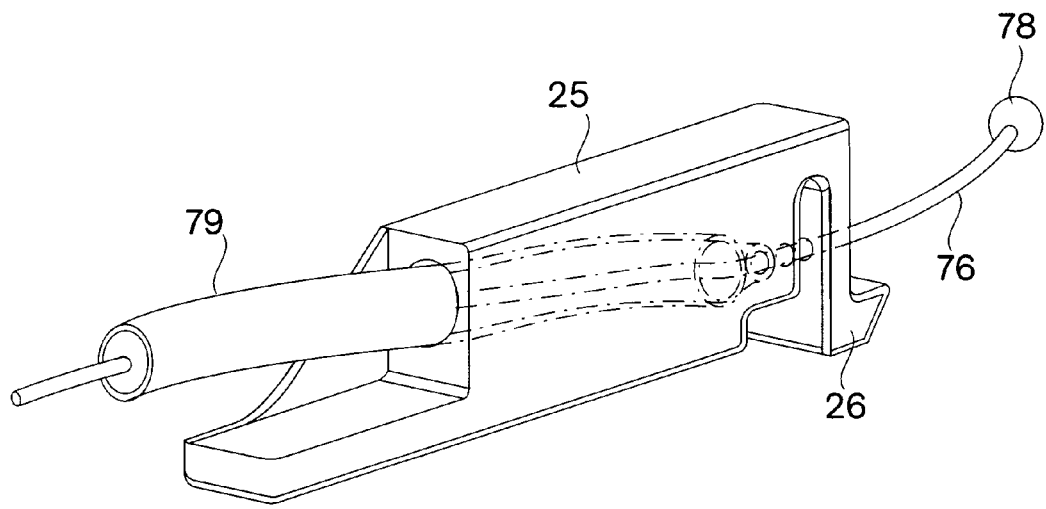
FIG. 3 is an isolated perspective view of the cable direction block with the drive cable routed through a serpentine passageway.
Figure 4:
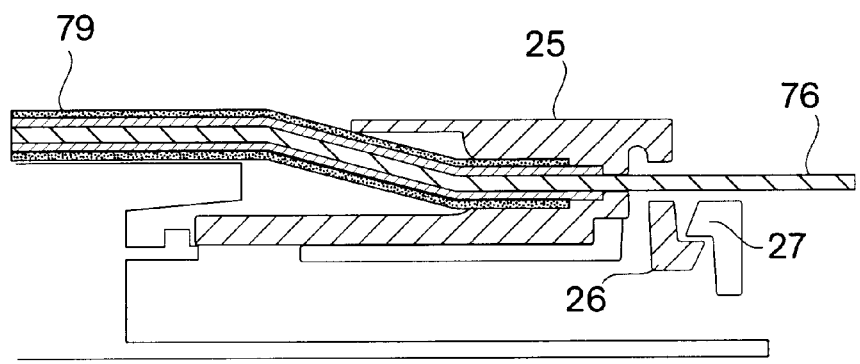
FIG. 4 is a cross section view taken along line 4—4 in FIG. 1 showing the cable routed through the serpentine passageway in the cable direction block.

As best shown in FIGS. 2–4, cable directional blocks 25, 35 are mounted around each cable. Each conduit 79 preferably ends at or in the cable directional block while the cables 76, 77 extend to the sliding pane 11. The drive cables 76, 77 are routed by the cable directional blocks through a serpentine passageway 31 (seen in phantom in FIG. 3) so that the cable extends from the blocks to the sliding pane in a horizontal direction generally parallel to the lower horizontal edge 18 of the sliding pane. The cables 76, 77 now properly aligned, pull the sliding pane in a direction generally parallel to the direction of travel, and avoid pulling the sliding pane up into the upper run channel or down into the lower run channel.

In accordance with a highly advantageous feature, each of the cable directional blocks 25, 35 are mounted on the frame 14 by snap fit engagement. Snap fit engagement eliminates the need for separate fasteners and makes installation quicker, thereby greatly easing assembly of the blocks to the sliding window assembly. Such snap fit engagement relies upon the resiliency or position memory of at least one flexible or deformable member of a component to establish a position locking engagement with a corresponding member or orifice in a second component. Typically and preferably this is accomplished by simply pushing the two components together, usually by hand. Representative cable directional block 25 has a flexible finger 26, shown in FIGS. 2–4, which temporarily deforms as it moves past projection 27 extending from the frame. One side of the cable directional block 25 is placed in an opening in the frame 14, and can be located properly using locating boss 32. The other end of the block is then rotated down into the assembled position. Once the finger 26 clears the projection 27, the block 25 snaps into place to the frame. This is often accompanied by a snapping sound, positively indicating to an assembler that the block 25 has been successfully installed.

As seen in FIGS. 1 and 2, first cable directional block 25 is preferably attached to the frame near the location of the sliding pane 11 when in the open position, and second cable directional block 35 is preferably attached to the sliding pane near the location of the sliding pane when in the closed position. In other words, the cable directional blocks are preferably attached to the frame near the end of a travel range of the sliding pane.

Figure 5:
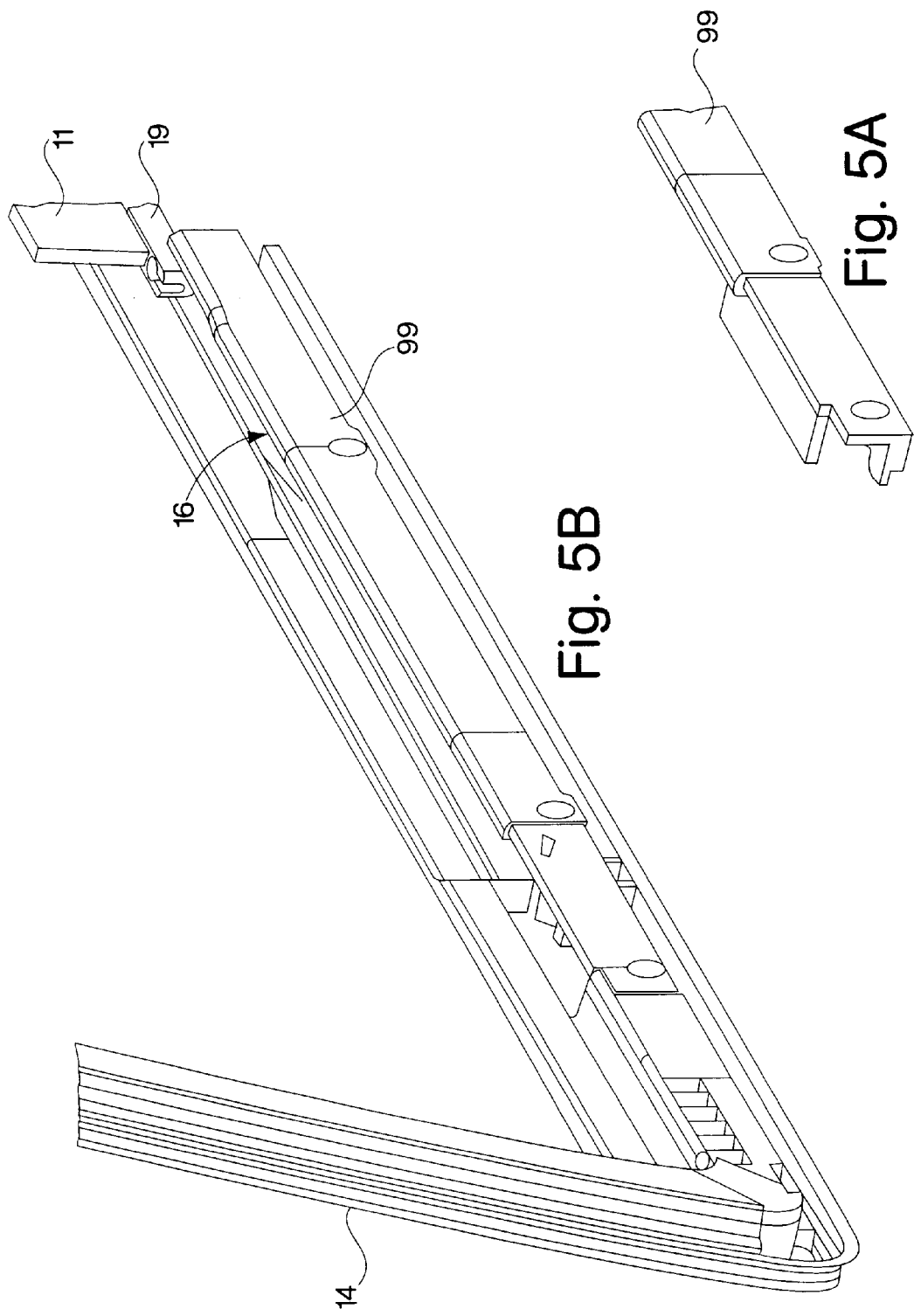
Fig. 5A is an isolated perspective view showing the lower backplate before installation of the cable direction blocks in accordance with an alternative preferred embodiment.
FIG. 5B is a perspective view, partially broken away, showing the lower backplate attached to the frame after installation of the cable directional blocks.

Figs. 5A and 5B show an alternative preferred embodiment where a retrofitting kit may be used to convert a manual sliding window assembly into a power sliding window assembly. The kit could be used as a dealer installed option, for example. A backplate 99 is removed to allow for easy access to the frame 14. The kit would include the cable assembly 75, drive motor 71 and drive drum 72, retainer 81 and plunger 82, spring 84 and spring compressor blocks 83 (seen in detail FIGS. 8 and 9), cable directional blocks 25, 35 and the cradle 19. With the backplate removed, the sliding pane 11 can be removed so that the cradle 19 can be attached to the lower horizontal edge 18 of the sliding pane. The cable directional blocks can be attached to the frame without interference from the backplate. Optionally a portion of the backplate 99 may be removed to provide clearance for the cable directional blocks 25, 35. Once the cradle is attached to the sliding pane, the cables attached to the cradle and the cable directional blocks snap fitted onto the frame, the backplate may be reattached. The removable spring compressors can then be removed as discussed below. To complete assembly, the motor can be mounted to the motor vehicle and electrically connected to a power source. Optionally a switch (not shown) may be provided to control the flow of electricity to the motor.

Figure 6:
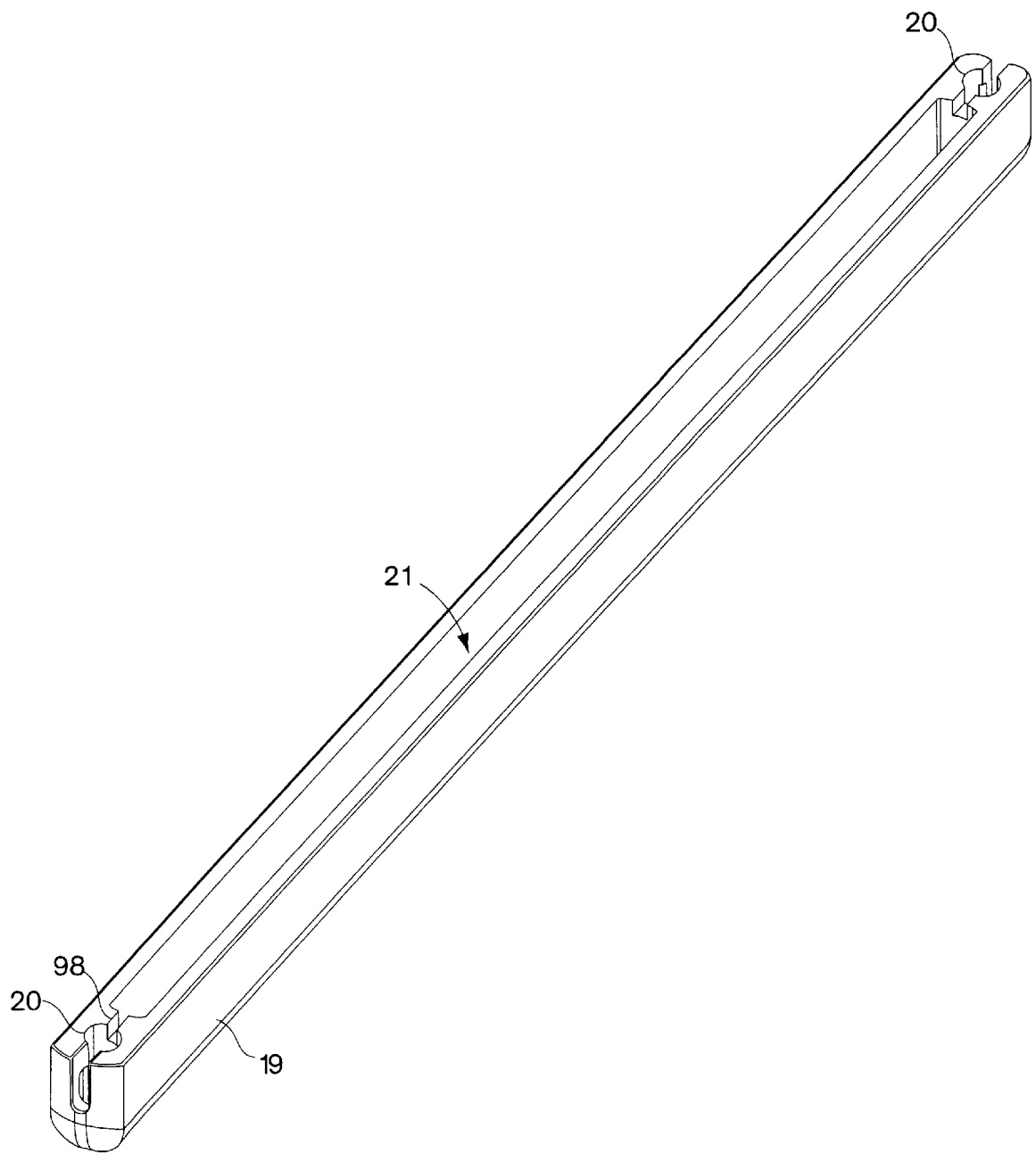
FIG. 6 is an isolated perspective view of the sliding pane cradle.
Figure 7:
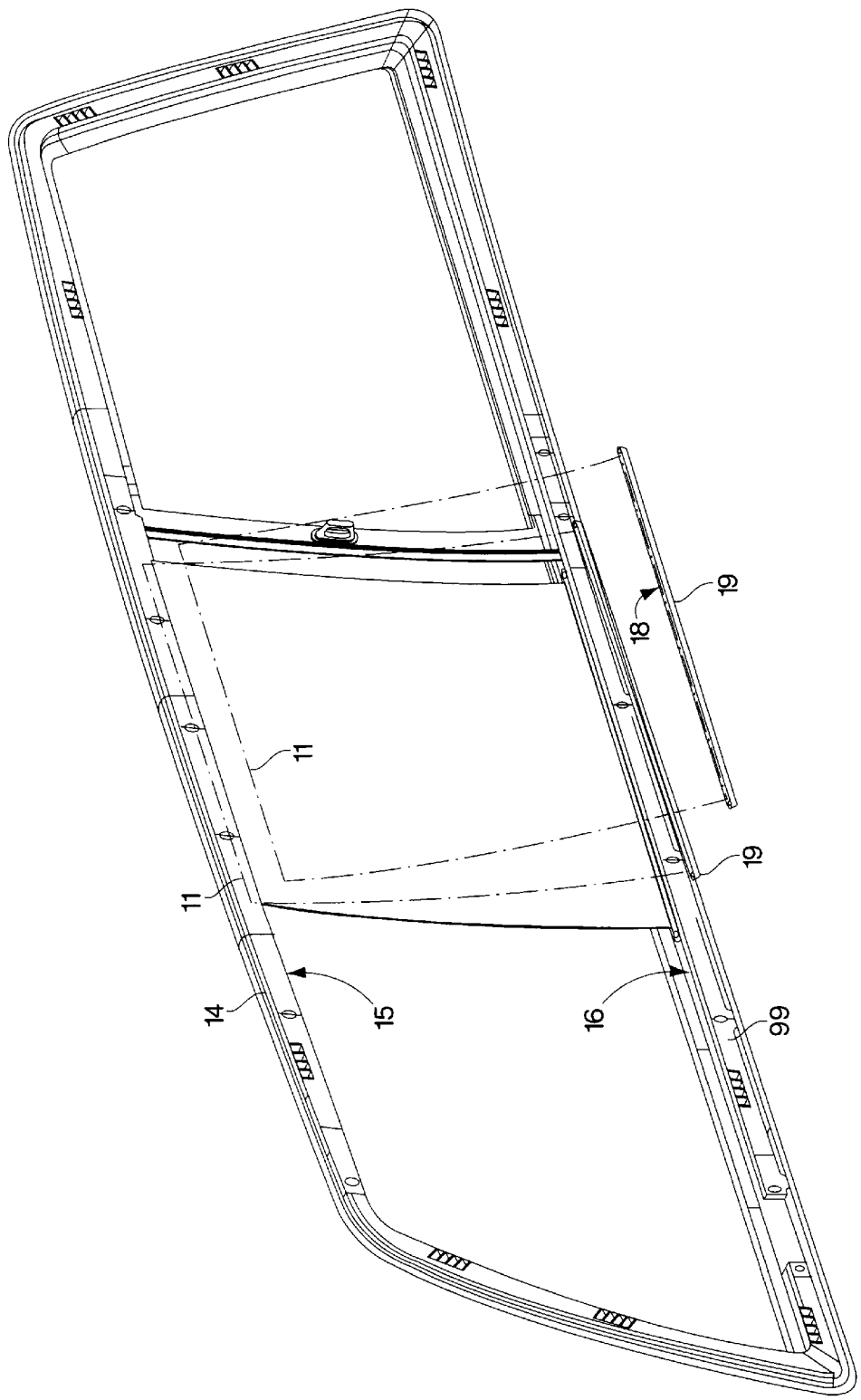
FIG. 7 shows the cradle attached to the sliding pane, with the sliding pane about to be reinstalled to the sliding window assembly in accordance with the preferred embodiment of FIG. 5A.

FIGS. 6 and 7 show the cradle 19 or glass attachment bracket. A central opening 21 is sized to snugly receive the lower horizontal edge 18 of the sliding pane 11. Endball cups 20 are positioned on either end of the cradle, each cup receiving a corresponding endball 78 on a corresponding cable. The cup widens from a narrow slot wide enough to receive the cable to a larger opening sized to snugly receive the endball. In this manner each cable 76, 77 is attached to one side of the sliding pane so that tension on cable 76 urges the sliding pane in a first direction and tension on cable 77 urges the sliding pane in a second direction opposite the first direction. Drains 98 connect the central opening to each of the endball cups. The drains serve to route water away from an interior of a motor vehicle.

Figure 8:
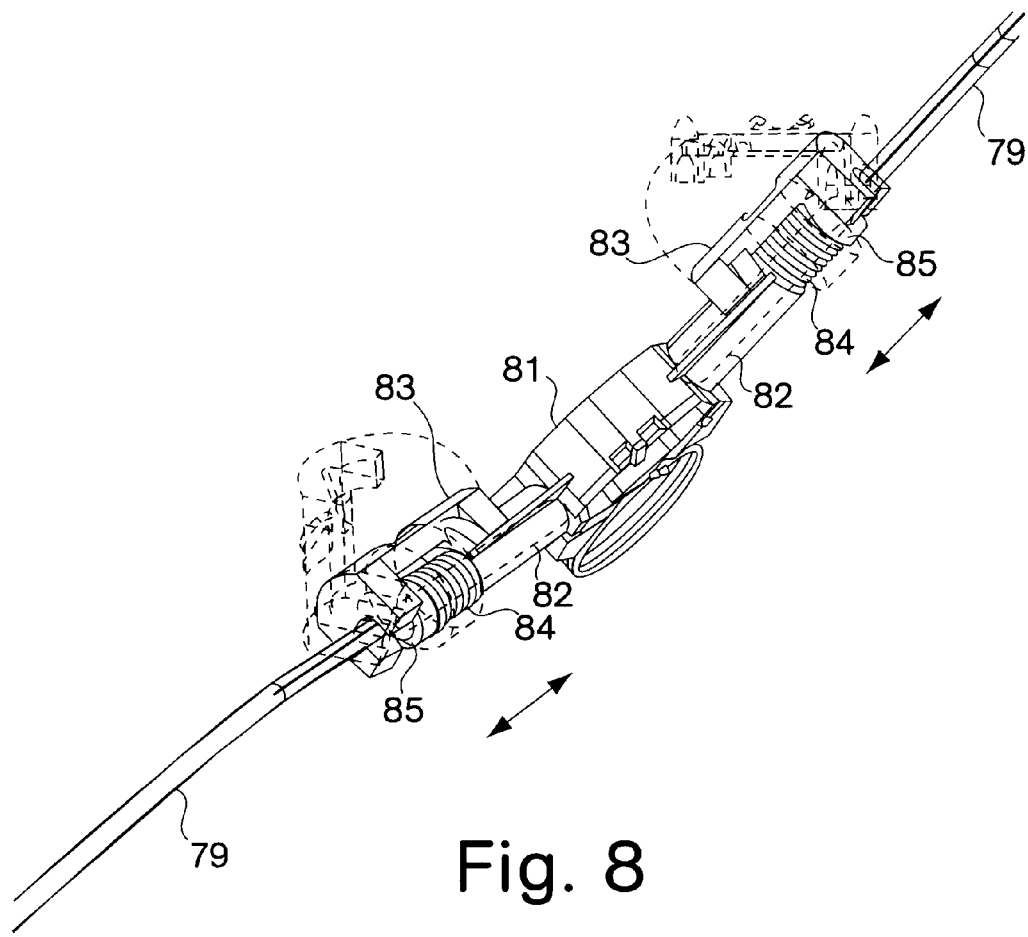
FIG. 8 is a perspective view of the retainer, plunger and spring compressor, isolated from the drive drum and drive motor, showing in phantom how the spring compressors may be readily removed upon attachment of the drive cable to the sliding pane.
Figure 9:
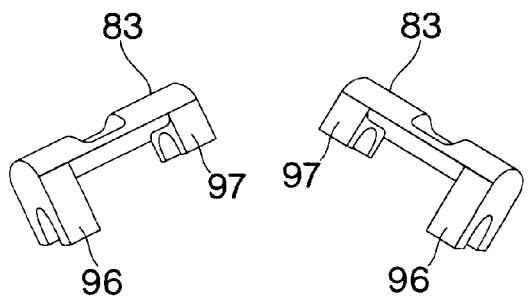
FIG. 9 is a perspective view of the removable spring compressors of FIG. 8.
Figure 10:
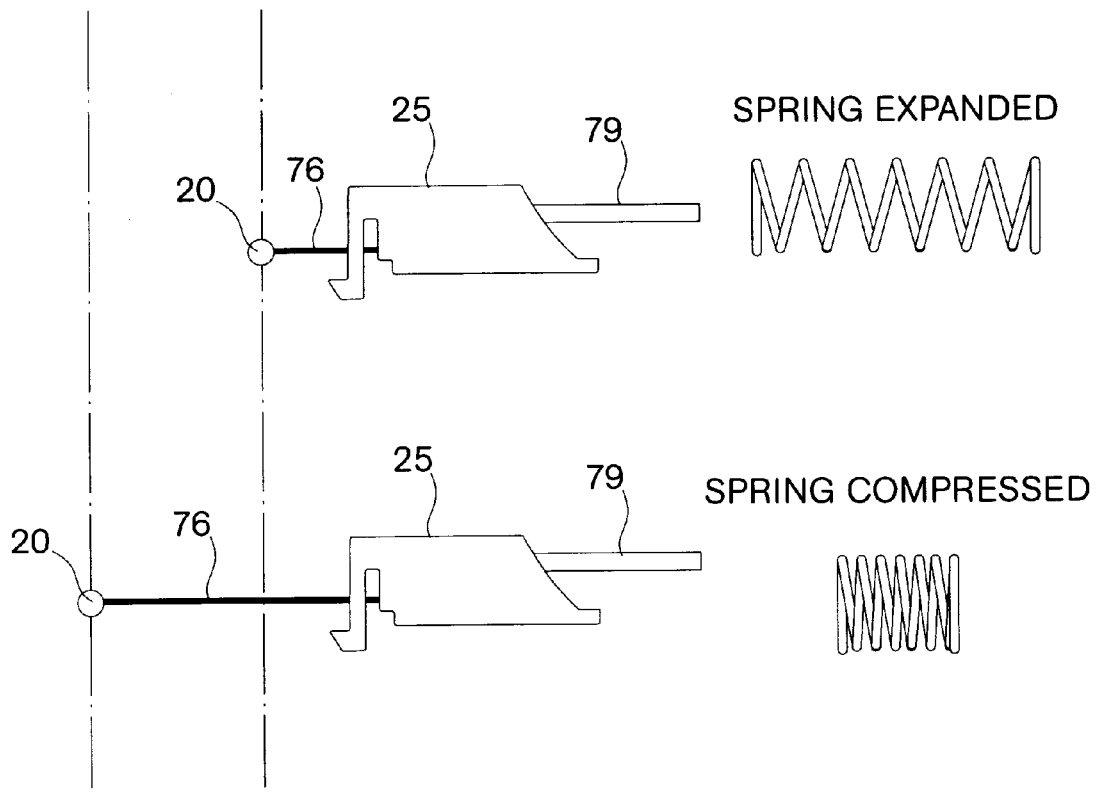
FIG. 10 is a schematic view showing the position of the cable with respect to the conduit when the spring is in the expanded and compressed positions.

FIGS. 8–10 show how removable spring compressors 83 maintain slack in the cables 76, 77 until removed. This is a highly advantageous feature that makes it easy to attach the cables to the cradle 19 even when the cables are preassembled to the drive drum 72. The cable assembly comprises a pair of cables 76, 77, each having a conduit 79. The conduit is a semi-rigid tube shaped member design to provide stability to the cable and to guide the cable, and to protect the cable from wear. More specifically, during normal operation of the power sliding assembly, one cable is in tension and the other is not. The conduit keeps the cable not in tension from flopping about in an uncontrolled manner.

A first end of each cable 76, 77 is attached to the drive drum 72, and the second end of each cable is attached to the cradle as discussed above. A spring retainer assembly is mounted with the drive drum, and comprises retainer 81, plungers 82, springs 84 and removable spring compressors 83. The retainer 81 is mounted over the drive drum so that the cables are sandwiched between the retainer and the drive drum. As shown in FIG. 8, each plunger 82 extends into a corresponding opening in the retainer. Each cable is routed through a corresponding plunger, and from there through each corresponding opening in the retainer to the drive drum (not shown).

A spring 84 is captivated between a collar 85 of the plunger 82 and the retainer. Each spring is movable from an expanded condition where the springs biases the corresponding plunger away from retainer, to a compressed condition where the plungers move closer to the retainer. Moving the plunger has the effect of moving the conduit with respect to the cable. The more the cable extends out of the conduit, the more it is said to be slack, and a slack cable is easier to attach to the cradle 19 than a taut cable. In other words, the travel path the cable and conduit take between the drive drum and the cradle decreases as the plunger moves closer to the retainer. In this circumstance the conduit length does not change, therefore more of the cable must necessarily extend from the conduit, producing the slackness effect. Such slackness is particularly important on the side of the sliding window assembly immediately adjacent cable directional block 35, where very little cable extends out from block 35. FIG. 10 shows how the cable 76 gives the appearance of lengthening as the spring 82 moves from the expanded position to the compressed position. Typically the increased length of cable is generally equivalent to the amount the spring is compressed.

In accordance with a highly advantageous feature, removable spring compressors 83, shown in FIGS. 8 & 9, are used to hold both springs simultaneously in the compressed condition. This permits both cables 76,77, to be simultaneously slack, so that the cables may be attached to the cradle even though the cables have been wrapped around the drive drum. Each spring compressor 83 comprises a generally C-shaped member having a first projection 97 which engages the retainer 81 and a second projection 96 which captivates the collar 85 of the plunger 82. The distance between spring compressor projections 96,97 restrict the spring to the compressed condition where the cables are slack. Optionally a tie or wire may be used to hold the removable spring compressors until the cables 76, 77 have been attached to the cradle. Other suitable shapes for the spring compressors that serve to captivate the spring in the compressed condition will be readily apparent to those skilled in the art given the benefit of this disclosure.

Figure 11:
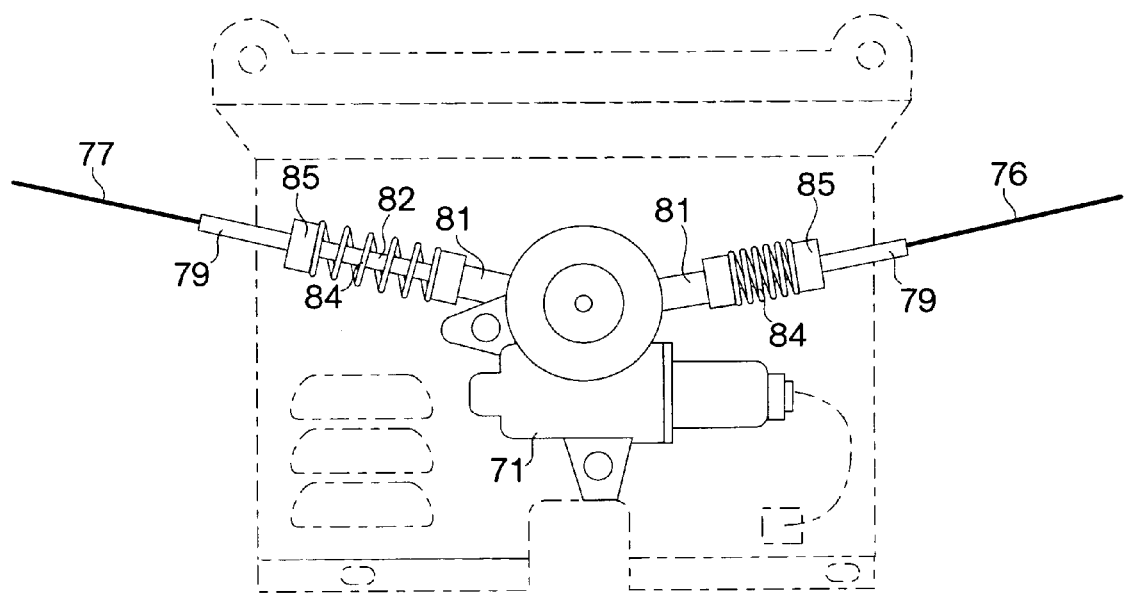
FIG. 11 is an outboard side view of the retainer, plungers and springs in the installed position after the removable spring compressors have been removed.

FIG. 11 shows the spring retainer assembly with the spring compressors removed, as would be the case once the power sliding window assembly has been finally assembled. One spring is shown in the compressed condition, the other in the expanded condition. When one cable 77 is in tension, as it would be when pulling the sliding pane, the spring around that cable is expanded. When the other cable 76 is in compression, as it would be while the other cable is pulling the sliding pane, the spring around that cable is compressed.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A sliding window assembly comprising, in combination:
    a frame mountable in a recess in a motor vehicle body;
    a sliding pane slidable between a open position and a closed position;
    drive means and a drive drum rotatable by operation of the drive means; and
    a pull-pull cable assembly for moving the sliding pane between the open position and the closed position comprising:
        drive cable comprising at least one cable having first and second ends and sheathed in a conduit, operatively connected between the drive drum at the first end and the sliding pane at the second end, wherein the drive cable pulls the sliding pane toward the open position upon rotation of the drive drum in a first direction, and the drive cable pulls the sliding pane toward the closed position upon rotation of the drive drum in a second direction opposite the first direction;
        a retainer mounted to the drive motor and a plunger having a collar at one end, the plunger being slidably received into an opening of the retainer, wherein the cable is routed through the plunger and into the retainer opening;
        at least one spring positioned between the retainer and the plunger, wherein the spring in an expanded condition biases the plunger away from the retainer and the second end of the drive cable extends beyond the conduit by a length, and when the spring is in a compressed condition the plunger collar is closer to the retainer and the second end of the drive cable extends beyond the conduit by an increased length; and
        at least one removable spring compressor compressing the spring, and restricting the spring from moving to the expanded condition.

2. The sliding window assembly of claim 1 wherein the removable spring compressor has a first projection and a second projection, the first projection engages the retainer and the second projection engages the plunger to restrict sliding motion of the plunger away from the retainer.

3. The sliding window assembly of claim 1 wherein when the removable spring compressor is removed the spring can move to the expanded condition and the drive cable becomes less slack.

4. The sliding window assembly of claim 1 further comprising at least one cable directional block mounted to the frame, routing the drive cable to the sliding pane so that the drive cable pulls the sliding pane in a direction generally parallel to a motion of the sliding pane between the open and closed positions.

5. The sliding window assembly of claim 4 wherein at least one of the cable directional block and the frame is provided with a flexible finger and the other of the cable directional block and the frame is provided with an opening sized to receive the flexible finger, producing a snap fit engagement between the cable directional block and the frame.

6. The sliding window assembly of claim 4 wherein the conduit extends between the retainer opening and the cable directional block, and ends in a serpentine passageway formed in the cable directional block.

7. The sliding window assembly of claim 1 wherein the drive cable has cable endballs positioned at each end of each cable, and further comprising an elongate cradle having a central opening sized to snugly receive a lower peripheral edge of the sliding pane, and first and second endball cups each sized to receive one of the endballs of the drive cable.

8. The sliding window assembly of claim 1 further comprising left and right fixed panes affixed to the frame, and the sliding pane slides laterally between upper and lower run channels defined at least in part by the frame.

9. The sliding window assembly of claim 1 wherein the drive means is an electric drive motor.

10. A retrofitting kit for retrofitting a manually sliding window assembly installed in a motor vehicle to be power operated, the retrofitting kit comprising:
    a drive motor for mounting to the motor vehicle, the drive motor having a drive drum rotatable upon actuation of the drive motor;
    a cable assembly for pull-pull powered opening and closing of a sliding pane, comprising left and right cables, each cable attached to the drive drum and attachable to a sliding pane;
    a spring retainer assembly comprising:
        left and right plungers corresponding to the left and right cables, respectively, with each cable coaxially positioned within a corresponding plunger;
        a retainer affixed to the motor and provided with a left opening and a right opening, wherein the left and right plungers are slidably received in the left and right opening of the retainer, respectively;
        left and right springs interposed between the left and right plunger, respectively, and the retainer, each spring being movable between an expanded condition where the corresponding plunger is biased away from the retainer to a compressed condition where the corresponding plunger is movable towards the retainer; and
        left and right removable spring compressors restricting motion of the left and right plunger, respectively, away from the corresponding retainer opening and thereby restricting the corresponding spring from moving to the expanded condition.

11. The retrofitting kit of claim 10 wherein each of the removable spring compressors has a first projection and a second projection, each first projection engages the retainer and each second projection engages a corresponding plunger to restrict motion of the plunger away from the retainer.

12. The retrofitting kit of claim 10 further comprising cable attachment means for attaching the left and right cables to the sliding pane, comprising an elongate cradle having left and right endball cups and a central opening sized to snugly receive the lower peripheral edge of the sliding pane;

wherein endballs are positioned on a first end and a second end of each cable, the first endball of each cable sized to be received by the drive drum, and the second endball of each cable sized to fit within one of the endball cups.

13. The retrofitting kit of claim 10 further comprising a left cable directional block corresponding to the left cable and a right cable directional block corresponding to the right cable, each cable directional block mounted to the frame and each cable directional block routing the corresponding cable to the sliding pane so that the cable pulls the sliding pane in a direction generally parallel to a motion of the sliding pane between the open and closed positions.

14. The retrofitting kit of claim 10 further comprising a left conduit positioned around the left cable and a right conduit positioned around the right cable, wherein each of the cables moves with respect to the corresponding conduit as the corresponding spring moves between the expanded condition and the compressed condition.

15. The retrofitting kit of claim 14 wherein endballs are positioned on a first end and a second end of each cable, the first endball of each cable sized to be received by the drive drum, and the second endball of each cable moves away from the corresponding conduit as the corresponding spring moves to the compressed condition.

* * * * *